L. GREB.
POTATO PLANTER.
APPLICATION FILED MAR. 13, 1917.
1,276,646.
Patented Aug. 20, 1918.
2 SHEETS—SHEET 1.
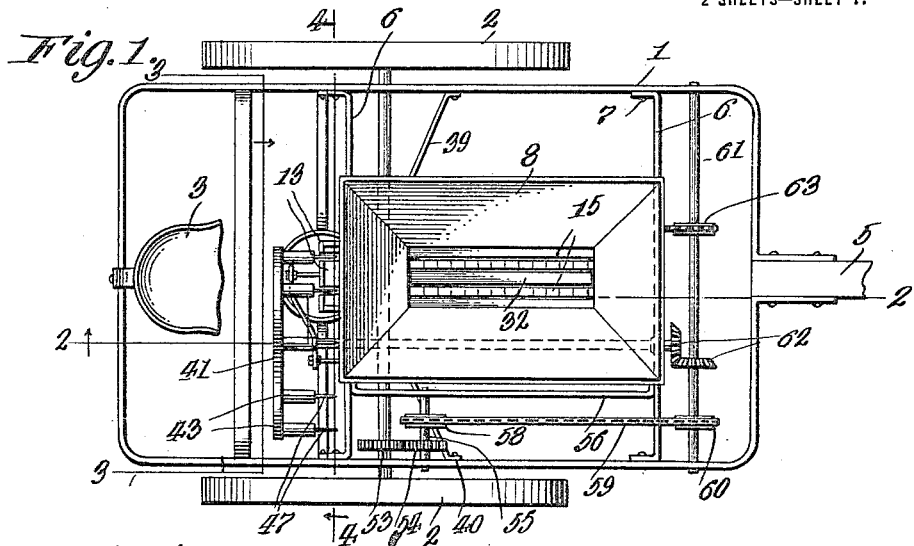
Fig. 1.
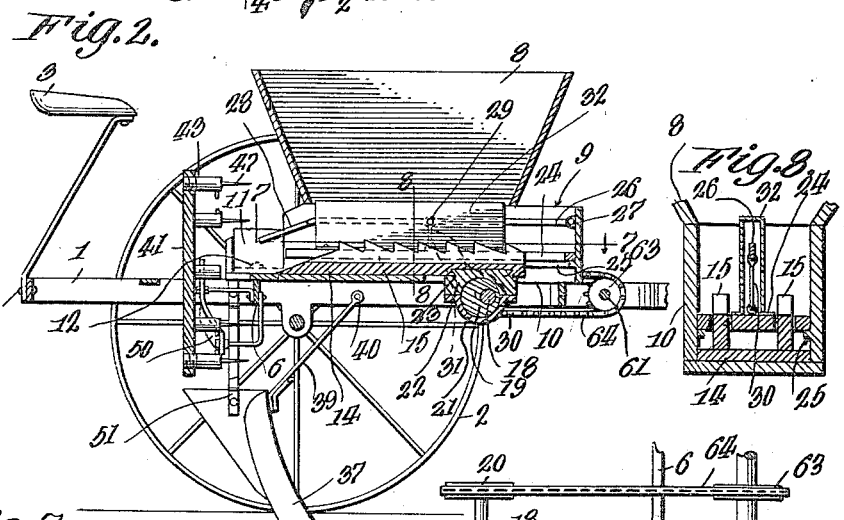
Fig. 2.
Fig. 3.
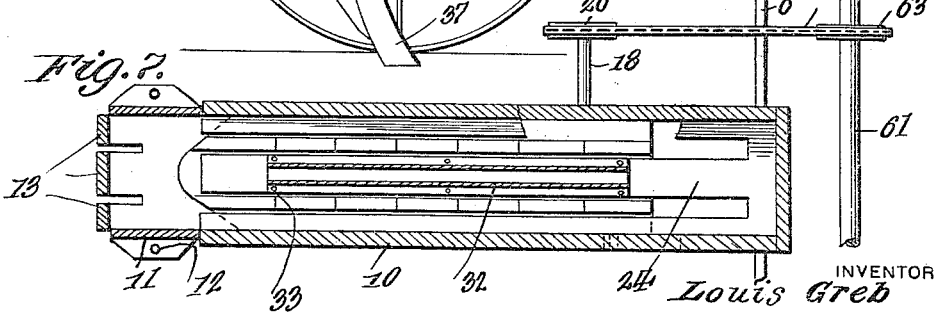
Fig. 7.
INVENTOR
Louis Greb
WITNESSES
Guy M. Spring
N. F. Kellogg
BY Richard B. Owen
ATTORNEY

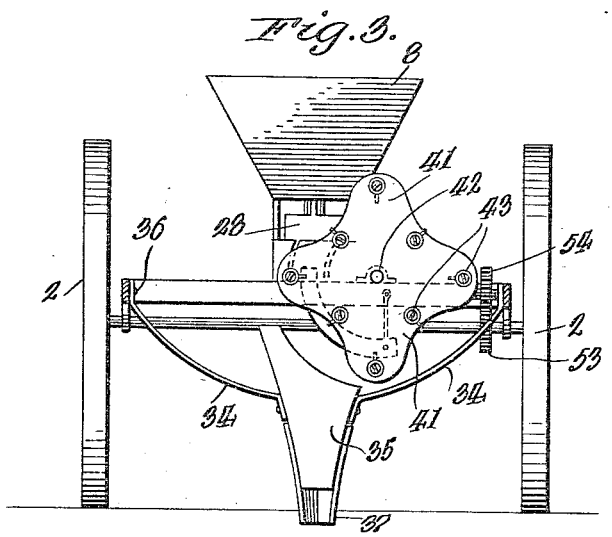
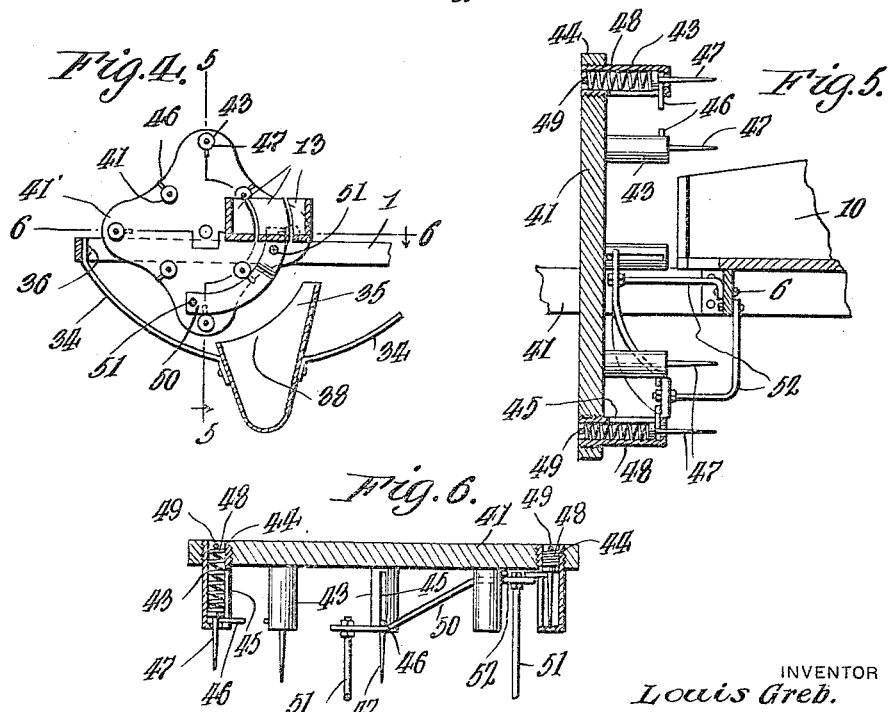

UNITED STATES PATENT OFFICE.

LOUIS GREB, OF APPLETON, WISCONSIN.

POTATO-PLANTER.

1,276,646.  Specification of Letters Patent.  Patented Aug. 20, 1918.

Application filed March 13, 1917. Serial No. 154,525.

*To all whom it may concern:*

Be it known that I, LOUIS GREB, a citizen of the United States, residing at Appleton, in the county of Outagamie and State of Wisconsin, have invented certain new and useful Improvements in Potato-Planters, of which the following is a specification.

The present invention has reference, generally, to improvements in planters; and, the invention relates, more particularly, to a novel potato planter.

The invention has for its principal object to provide a potato planter so constructed and arranged as to positively deposit within the soil but a single potato during each discharging operation of the same, thereby, insuring proper planting of the potatoes and consequently, facilitating the growth of the crop in general.

As an object of equal importance, the invention aims to provide a novel potato selecting and transferring means, whereby, a single potato segment will be removed from the hopper of the planter and carried to the planting apparatus thereof, whereat, it will be released and permitted to drop thereinto.

It is also an aim of the invention to provide means for feeding the potato segments in a uniform manner to a position for engagement by the selecting and transferring means, without crushing or in any way materially mutilating the same.

Still further, it is an object of the present invention to embody with a potato segment feeding means, an improved regulating or controlling device, the same serving as a means for preventing the feeding of an excessive number of potato segments to the selecting and transferring means, thus, preventing clogging and other similar disabilities and allowing the planter to efficiently perform its functions.

Other objects relate to considerations of economy of production, durability in use, and convenience in operation of the several mechanisms or parts entering into the construction of elements and the above defined general organization of said elements.

Other improvements and novel details in the construction and arrangement of the various parts of the planter will be brought out more in detail in the description to follow, which, for a clear understanding of the invention, should be considered in connection with the accompanying drawings forming a part hereof, and wherein is disclosed for the purpose of illustration, a convenient and satisfactory embodiment of the invention.

In the drawings:

Figure 1 is a top plan of my improved planter,

Fig. 2 is a longitudinal section in elevation therethrough taken on the line 2—2 of Fig. 1 looking in the direction of the arrow, Fig. 3 is a transverse section in elevation taken on the line 3—3 of Fig. 1, Fig. 4 is a section in detail of the potato segment and transferring means taken on the line 4—4 of Fig. 1, Fig. 5 is a section taken on the line 5—5 of Fig. 1 looking in the direction of the arrow, Fig. 6 is a section taken on the line 6—6 of Fig. 4 looking in the direction of the arrow, Fig. 7 is a horizontal section taken on the line 7—7 of Fig. 2 looking in the direction of the arrow, and Fig. 8 is a transverse section in detail taken on the line 8—8 of Fig. 2.

Referring now more specifically to the drawings and in connection with which like reference numerals will refer to corresponding parts throughout the several views thereof, the improvements may be stated to embody the ordinary wheeled planter frame indicated in its entirety by the numeral 1, the same being supplied with supporting wheels 2. A seat 3 is affixed to the rear cross bar of the frame 1 as at 4 and obviously, provides for means for receiving the operator of the planter. Any suitable form of draft connection, such as indicated by the numeral 5 may be provided, whereby, the planter may be drawn.

Transverse bars 6 are arranged upon the frame 1 and are secured to the opposite sides thereof as indicated at 7, and provide for means whereby a hopper 8 and the improved feeding means, generally indicated at 9, will be supported in proper position. It is evident, that the hopper 8 provides a receiving means for containing the various potato segments and feeding the same to the feeding means 9.

My improved potato segment feeding means comprises a substantially rectangular body portion 10, the rear extremity of which is supplied with side members 11, pivotally mounted upon vertical retaining rods 12, while the end thereof is provided with a plurality of upstanding guard fingers 13, suitable ways being arranged between the adjacent edges of the said guard fingers for a purpose which will be subsequently apparent. Within the rectangular body portions 10 and resting upon the bottom thereof is slidably arranged a plate 14, having affixed to the upper face thereof a plurality of upstanding longitudinally arranged toothed potato segment feeding bars 15, which bars are adapted to be engaged with the various potato segments as discharged thereonto from the hopper 8 and feed the same forwardly to positions adjacent the guard fingers 13, it being noted that portions of the potato segments are exposed through the ways between the adjacent edges of the said fingers. In order to provide for means whereby the toothed bars 15 may be reciprocated in a manner so as to efficiently feed the potato segments forwardly, a shaft 18 is mounted in the framing of the machine and carries a sprocket 20. The shaft 18 carries an eccentric disk 19 with which an eccentric strap 21 engages. The strap 21 is secured to an eccentric block 22 which in turn is mounted on the feeding bar 15 through the medium of the dove tail connection 23. By reason of the eccentric connection, just referred to, upon rotation of the shaft 18 a reciprocatory movement will be imparted through the plate 14 and its several toothed bars 15.

To regulate the supply or discharge of the potato segments onto the teeth of the feeding bars 15 whereby to prevent clogging of the same and the feeding of an excessive number of potato segments therefrom, a grating 24 having longitudinally disposed ways therein corresponding to the said toothed bars 15 and of a length sufficient to prevent sliding thereof, is provided. The grating 24 rests upon a suitable ledge 25 formed upon the side and end walls of the body 10. The improved regulating arm 26 is pivotally engaged with the end wall of the body 10 as at 27 and has its forward end widened and arranged obliquely to the body portion thereof, as indicated at 28, thus, providing a substantially paddle-like construction. Intermediate the ends of the arm 26, an eye 29 is formed and has loosely engaged therewith a link 30, the lower end of the link being connected to the grating 24 as at 31. A housing 32 is arranged about the pivotal arm 26 and is secured to the grating 24, by rivets or the like 33. Thus, it will be seen, that as the potato segments are fed forwardly through the medium of the toothed bars 15, should an excessive number be carried thereby, the thickened or paddle portion 28 of the arm 26 will be engaged thereby and caused to move upwardly. Upward movement of the arm 26 will in turn impart a similar movement to the grating 24 by reason of the link connection 30, thus, raising the same out of engagement with the teeth of the bars 15 and prevent the discharge of the said potato segments thereonto. When the supply from the toothed feeding bars 15 has returned to normal, the paddle 28 will be permitted to lower, thereby, returning the grating 24 to its resting place on the ledge 25, whereupon, potato segments from the hopper 8 will be again discharged thereonto. By providing the movable gates or sections 11, it is evident, that binding and consequently clogging of the potato segments within the discharge end of the body 10 will be prevented.

Suspended upon a pair of bracket arms 34 is a chute 35, it being noted, that the said bracket arms are secured to the sides of the frame 1 as at 36. A suitable opening is arranged within the bottom of the chute 35 and obviously, permits the potato segments as deposited therein to be directed into the soil. As a means for forming a furrow whereby the segments will be planted as they are dropped from the chute 35, an earth-working shoe 37 is secured to the front side thereof and is adapted to work below the surface of the soil. Thus, upon movement of the planter, the various potato segments will be efficiently planted. The chute 35 has one upper side thereof cut away as at 38, thereby providing ample space to permit the uninterrupted travel of the improved potato segment selecting and transferring means, while in order that the chute together with the earth-working shoe 37 will be held against undue forward or backward movement, a bracing arm 39 is engaged with the same and secured to the frame 1 as at 40.

With a view toward providing efficient means whereby the potato segments may be removed from the feeding bars 15 and then delivered to the discharge chute 35, I provide my improved potato segment selecting and transferring device or means which comprises a rotatable supporting member 41, mounted upon a stub shaft 42, the stub shaft in turn being journaled in suitable bearings arranged upon the rear cross-bar 6 and preferably intermediate the ends thereof. As will be noted, the rotatable supporting member 41 is provided with a plurality of laterally extending arms, which I shall indicate by the numeral 41'. Upon the outer extremities of the said arms 41' I arrange a plurality of tubular socket members 43, screw threading the same as at 44 whereby they may be turned into engagement with the said arms. An elongated longitudinally disposed slot 45 is formed within one side of the socket 43 and receives therethrough a guide finger 46 which guide finger is carried upon a headed pin 47 slidably mounted in the socket 43 and having the pin portion thereof projecting through the open outer end of the said socket. An expansible coiled spring 48 is engaged with the inner face of the head of the pin 47 and to maintain the same in such engagement a cross-pin 49 is passed through the remaining end of the socket 43 and affords an efficient bearing means for the remaining end of the said spring. Thus, it is evident, that the pin 47 will be normally held in extended position and that due to the guide finger 46 rotation of the same will be prevented. Furthermore, it will be noted, that a portion of the guide finger 46 extends beyond its respective socket 43. A second set of sockets 43 is arranged upon the rotatable supporting member 41 at points adjacent the bases of the arms 41' and are provided with means similar to the means as arranged in the sockets positioned at the outer ends of the said arms 41'. By so arranging the two sets of sockets 43, it will be understood, that the respective pins 47 thereof will be brought to positions adjacent the ways as arranged between the adjacent edges of the fingers 13, which ways are curved to accord with the arc of travel of the said pins.

A segmental inclined track 50 is secured in proximity to the several sets of sockets 43 through the medium of bracket arms 51, the said bracket arms in turn, being secured by suitable fastening devices to the rear cross-bar 6. As will be noted, the incline of the track 50 is in a direction away from the fingers 13 and that portion of the same as adjacent the ways between the said fingers represents the greatest portion of the incline. By this means, when the rotatable supporting member is rotated the projecting portions of the guide fingers 46 will engage the track 50 and due to the incline thereof, the pins 47 will be retracted or drawn entirely within their respective sockets 43 in a successive manner. Upon continued rotation of the member 41, the fingers 46 of the retracted pins 47 will be disengaged from the track 50 whereupon, the expansible springs will serve as means for forcing their respective pins abruptly outwardly through the curved way between the fingers 13. When forced outwardly, the pins 47 will each engage a potato segment, which segment will be removed from the discharge end of the body portion 10 and carried to a point over the chute 38. At this time, the guide fingers 46 will again be engaged with the inclined track and the pins 47, consequently, disengaged from the segments as carried thereby, thus, permitting the same to be dropped into the chute 35 whereupon they will be deposited or planted in the soil. To permit the potato segments to be sufficiently released prior to a repeated releasing of the pins 47, the upper end of the track 50 is arranged parallel to the supporting member 41, as at 52. Thus, travel of the guide fingers along the parallel portion of the track will afford sufficient time for the potato segment releasing operation. From the above, it is evident that each of the pins 47 as arranged within the various sockets 43 will successively engage the potato segments and in a like manner will release the same permitting them to drop within the discharge chute 35.

In order to provide a suitable drive means whereby the toothed feeding bars 15 and the rotatable supporting member 41 will be driven, there is fixedly mounted upon the axle of the planter frame 1, a gear 53, which gear meshes with a second gear 54 arranged upon a stub-shaft 55 which is journaled within one side of the frame 1 and a longitudinally disposed supporting bar 56. A sprocket wheel 58 is keyed to the shaft 55 and has a sprocket chain 59 arranged thereabout, which chain is extended forwardly about a second sprocket wheel 60 fixedly mounted upon a cross-shaft 61, this shaft being journaled in the side portions of the frame 1. The shaft 42 which supports the rotatable member 41 extends forwardly through a bearing in the forward cross-bar 6 to a point adjacent the shaft 61 and is connected thereto by means of beveled gearing 62. A sprocket wheel 63 is arranged upon the said shaft 61 in spaced relation to the beveled gearing 62 and is provided with a sprocket chain 64, which chain engages the sprocket wheel 20. Thus, upon rotation of the wheels 2 of the planter, due to movement thereof over a field, rotary motion will be transmitted from the axle thereof to the counter-shaft 61 whereupon such motion will be then transmitted to the rotatable supporting member 41 and the disk 19, the rotary motion to the disk 19 being transformed into reciprocatory motion by means of the strap 21 and the block 22 as connected with the toothed feeding bars 15.

From the foregoing, it will be appreciated that I have provided an improved planter, the construction of which is such as to eliminate the planting of an excessive number of potato segments or the like within a single hill. Furthermore, the device will be caused to operate in an efficient manner by means of the improved regulating arm 26, which arm will prevent the clogging of the potato segments when fed forwardly from the hopper 8 and also, mutilation of the segments due to binding thereof upon the various teeth of the feeding bars 15.

It will be understood, that any number of sockets 43 and pins 47 may be arranged upon the supporting member 41 and further, that the particular formation of the supporting member may be varied such as conditions or preference may dictate.

As hereinbefore indicated, I do not wish to be understood as confining the invention to the particular embodiment chosen for illustration herein, nor to the exact construction, arrangement and adaptation of the parts shown and described, but I reserve the right to make any changes and alterations that fairly fall within the spirit and scope of the invention.

I claim:

1. In a potato planter, a hopper, means for feeding the potato segments from the hopper, a chute carried by the planter and arranged in proximity of the feeding means for receiving the potato segments, and means adjacent the feeding means for preventing the discharge of potato segments thereonto whenever said feeding means has discharged an excess of segments from the hopper.

2. In a potato planter, a hopper, means for uniformly feeding the potato segments from the hopper, a chute carried by the planter and arranged in proximity of the feeding means for receiving the potato segments, and pivotal float means adjacent the feeding means for controlling the discharge of potato segments from the hopper thereonto.

3. In a potato planter, a hopper, reciprocal means for uniformly feeding the potato segments from the hopper, means operative upon movement of the planter for actuating said feeding means, a chute carried by the planter and arranged in proximity of the feeding means for receiving the potato segments therefrom, pivotal means arranged adjacent the feeding means for controlling the discharge of potato segments thereonto.

4. In a potato planter, a hopper, means for uniformly feeding the potato segments from the hopper, a chute carried by the planter and arranged in proximity of the feeding means for receiving the potato segments therefrom, an arm pivotally mounted adjacent the feeding means, and means engageable with the potato segments upon said feeding means for controlling the discharge of the remaining potato segments from the hopper thereonto.

5. In a potato planter, a hopper, means for uniformly feeding the potato segments from the hopper, a chute carried by the planter, potato selecting and transferring means adapted to remove a predetermined number of potato segments from the feeding means and discharge the same into said chute, and means arranged adjacent the feeding means for controlling the discharge of potato segments from the hopper thereonto.

6. In a potato planter, a hopper, means for uniformly feeding the potato segments from the hopper, a chute carried by the planter, a rotatable member arranged on the frame, means arranged upon said rotatable member for engaging a predetermined number of potato segments and removing the same from the feeding means to said chute whereat they are released thereinto, and means adjacent the feeding means for controlling the discharge of potato segments from the hopper thereonto.

7. In a potato planter, a hopper, reciprocal means for uniformly feeding the potato segments from the hopper, a chute carried by the planter, a rotatable member on the planter, a plurality of spring pressed pins carried by said rotatable member, an inclined track arranged adjacent said pins and engaged therewith for intermittently depressing and releasing the same whereby a predetermined number of potato segments will be engaged thereby and removed from the feeding means to said planting means and released thereinto, a pivotal arm arranged adjacent the feeding means, and means arranged upon said pivotal arm adapted to be engaged by the potato segments on said feeding means for controlling the discharge of the remaining potato segments from the hopper thereonto.

8. In a potato planter, the combination of a hopper, a chute, feeding bars carried adjacent said hopper, means for reciprocating said feeding bars, for moving potato segments from said hopper, means for receiving the potato segments from said feeding bars and depositing the same in said chute, a grating carried adjacent said receiving bars, and means for shifting said grating for limiting the passage of potato segments therefrom onto said feeding bars at times.

9. In a potato planter, the combination of a hopper, a chute, feeding means carried adjacent said hopper, for removing potato segments therefrom, means for receiving the potato segments from said feeding means and depositing the same in said chute, a grating carried adjacent said feeding means for shifting said grating for preventing the movement of potato segments onto said feeding means, thus regulating the supply of potato segments when the planter is in operation.

10. In a potato planter, the combination of a hopper, a chute, feeding means carried by said potato planter adjacent said hopper, means for receiving the potato segments from said feeding means and depositing the same in said chute, a grating carried adjacent said feeding means, an arm pivotally supported adjacent said grating, means connecting said arm to said grating, said arm projecting beyond the end of said feeding means, thus causing said arm to be engaged by an excessive amount of potato segments, whereby the arm will be raised for shifting said grating for limiting temporarily the movement of the potato segments onto said feeding means.

11. In a potato planter, the combination of a hopper, a chute, feeding bars carried by said hopper, means for reciprocating said feeding bars, means for receiving potato segments from said feeding bars and depositing the same in said chute, a regulating arm fixedly supported adjacent said feeding bars, a grating carried adjacent said feeding bars, a link connecting said arm to said grating, said arm overhanging the end of said grating, thus causing said arm to be engaged by an excessive quantity of potato segments moved thereagainst by the movement of said receiving bars thus causing said arm to be lifted for elevating said grating and temporarily limiting the movement of potato segments onto said feeding bars.

12. In a potato planter, the combination of a frame having a body carried thereon, a hopper overhanging said body, feeder bars positioned against said body, a block connected to said feeder bars, an eccentric disk engaging said block, means for rotating said disk for causing the reciprocation of said feeding bars, a ledge carried by said body, a grating having ways positioned upon said ledge, said feeding bars projecting through said ways, thus allowing potato segments to move from said hopper into engagement with said feeder bars, means for receiving potato segments from said feeding bars and depositing the same in said chute, a regulating arm pivotally mounted upon said body and having a twisted flat end extending adjacent the outer end of said grating, a link connecting said arm to said grating, thus causing an excessive quantity of potato segments to engage the flat twisted end of said arm for elevating the same and thus lifting said grating from engagement with said ledge for temporarily limiting the movement of potato segments onto said feeding bars.

In testimony whereof I affix my signature in presence of two witnesses.

LOUIS GREB.

Witnesses:
W. C. DITTMER,
R. E. CARNCROSS.

Copies of this patent may be obtained for five cents each, by addressing the "Commissioner of Patents, Washington, D. C."